United States Patent [19]

Chaker

[11] 4,313,983
[45] Feb. 2, 1982

[54] PROCESS FOR DEPOSITING LATEX FILMS ON METAL SURFACES

[76] Inventor: Mouhanad Chaker, 23 Moore Ct., Burlington, Vt. 05401

[21] Appl. No.: 175,302

[22] Filed: Aug. 4, 1980

Related U.S. Application Data

[63] Continuation-in-part of Ser. No. 36,109, May 4, 1979, abandoned.

[51] Int. Cl.³ ............................................. B05D 1/18
[52] U.S. Cl. ............................. 427/435; 260/29.6 R; 260/29.7 R; 427/399
[58] Field of Search ............................. 427/435, 399; 260/29.6 R, 29.7 R

[56] References Cited

U.S. PATENT DOCUMENTS 3,585,084  6/1971  Steinbrecher et al. ............. 427/435
4,214,022  7/1980  Kunnen et al. ..................... 427/435

OTHER PUBLICATIONS

Prieve et al., Ind. Eng. Chem. Prod. Res. Dev., vol. 17, No. 1, 1978, p. 32.

Primary Examiner—John D. Smith
Assistant Examiner—Richard Bueker
Attorney, Agent, or Firm—Thomas H. Murray

[57] ABSTRACT

Process for depositing latexes having a net electrical charge on metal surfaces without the application of electrical current, preferably by the generation of the metal cation at the surface of the metal in a bath containing hydrogen peroxide and an organic acid which forms negatively-charged or neutral complexes with that particular metal ion.

6 Claims, 11 Drawing Figures

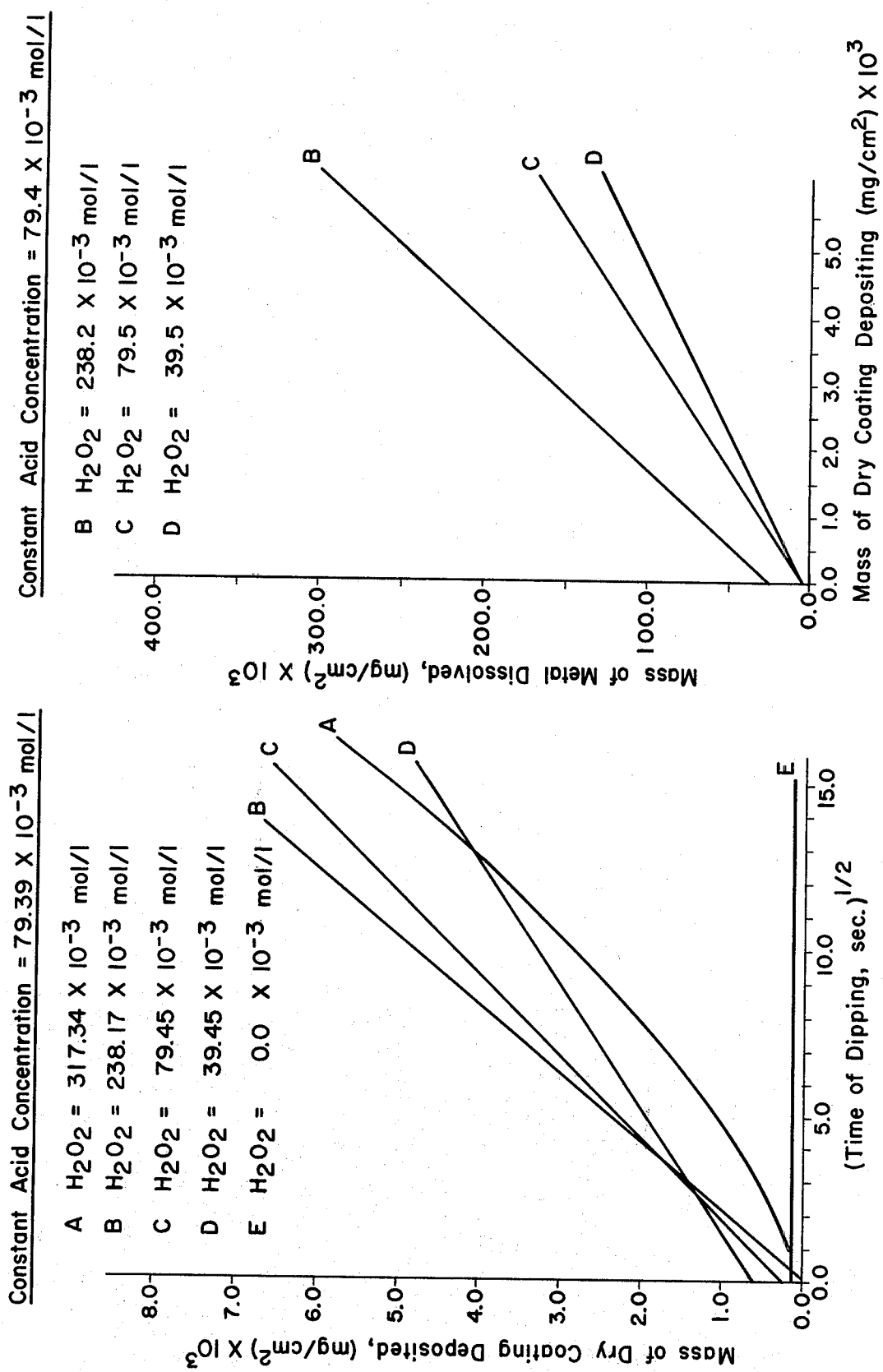

PROCESS FOR DEPOSITING LATEX FILMS ON METAL SURFACES

CROSS-REFERENCE TO RELATED APPLICATIONS

This application is a continuation-in-part of my co-pending U.S. patent application Ser. No. 36,109, filed May 4, 1979, now abandoned.

FIELD OF THE INVENTION

This invention relates to an improved process for chemiphoretic coating of metals from aqueous media.

BACKGROUND OF THE INVENTION

In the past, various processes have been devised for coating metal surfaces with latex by inserting the metal part to be coated into an aqueous bath containing a fine dispersion of latex particles. By using the metal part as an electrode and by causing an electrical current to flow through the bath, the charged latex particles will be attracted to and will adhere to the surface of the metal part. Electrical processes of this type, known as electrophoretic processes, are relatively complex and costly.

Similar processes for depositing coating on metals from aqueous media in the absence of applied electrical currents are known as chemiphoretic processes.

One chemiphoretic process which has been used to form latex coatings employs an aqueous bath containing both hydrofluoric acid and hydrogen peroxide (See German Offenlegungsschrift No. 22 11 490 dated Sept. 21, 1972 and German Offenlegungsschrift No. 24 09 876 dated Sept. 26, 1974). In this process, an electrical current is not required in order to form a latex film; however hydrofluoric acid is a dangerous chemical and excessive metal is dissolved during the coating process. Furthermore, a relatively long time, on the order of 2 minutes, is required to form a 1-mil film; and the build-up of salts in the bath due to the highly corrosive hydrofluoric acid rapidly reduces its effectiveness.

A similar chemiphoretic process is described in U.S. Pat. No. 3,585,084 and in Prieve et al, Ind. Eng. Chem. Prod. Res. Dev., 17, Number 1, 1978, Pages 32–36.

Another chemiphoretic process for coating metal articles with latex is described in German Offenlegungsschrift No. 26 23 895 dated Dec. 9, 1976. In this process, a metal object, preferably a steel object, is brought into contact with an aqueous cationic dispersion of latex particles, the aqueous dispersion containing a carboxylic acid radical such as the carboxylic radical of mandelic acid or citric acid. The application is primarily concerned with the production of cationic latexes by emulsion polymerization of monomers such as vinyl esters of fatty acids with 1 to 18 carbon atoms, unsaturated acids such as acrylic acid, esters of unsaturated acids with alcohol, glycols or epoxides with 1 to 18 carbon atoms, acrylonitrile or styrene, 1,3-butadiene. The German application implies that special cationically stabilized latexes are required in order to carry out the coating process.

SUMMARY OF THE INVENTION

In accordance with the present invention, a new and improved autodeposition process is provided for applying latex coatings on metallic surfaces to achieve a satisfactory coating. The latex particles, in aqueous solution, must carry a net positive electrical charge, or must be stabilized with a positively charged surfactant.

In carrying out the process, a metallic surface is dipped into an aqueous solution containing 2 to 30% by weight of latex particles which have a net positive electrical charge, this aqueous solution additionally containing about $10 \times 10^{-3}$ to $300 \times 10^{-3}$ mol per liter of hydrogen peroxide and about $10 \times 10^{-3}$ to $300 \times 10^{-3}$ mol per liter of an organic acid. The metallic article to be coated is maintained within the bath until a latex coating of a predetermined thickness has formed thereon. Acids which have been used successfully in the coating process of the invention are oxalic, malonic, malic, mandelic, citric and tartaric acids. However, any other acid capable of forming stable charged metal complexes with a particular metal ion which has been released from the surface of the substrate by the acid can be utilized.

In the preferred embodiment of the invention, the peroxide concentration should not exceed about $250 \times 10^{-3}$ mol per liter; and the ratio of the acid to the peroxide should be greater than 0.5 and less than 10. Metals on which coatings have been formed, depending upon the acid employed, include aluminum, zinc and iron or plain carbon steel. The application employs hydrogen peroxide to generate the latex which is used in the process but does not employ hydrogen peroxide in any coating process.

The aqueous solution should be substantially free of inorganic electrolytes. The presence of an inorganic electrolyte, such as fluoride ion, tends to interfere with the coating process. In appreciable quantities, the electrolytes will terminate the coating process.

The above and other objects and features of the invention will become apparent from the following detailed description taken in connection with the accompanying drawings which form a part of this specification, and in which:

FIG. 1 schematically illustrates the coating process of the invention;

FIG. 2 is a plot of coating deposited versus the square root of time of dipping for various hydrogen peroxide concentrations which can be utilized in the invention;

FIG. 3 is a plot of mass of dry coating deposited versus mass of metal dissolved for various concentrations of hydrogen peroxide;

In carrying out the invention, an aqueous solution is prepared containing 2 to 30% by weight of cationically stabilized latex particles, with an excess of the cationic surfactant present in the solution of the bath (0.1–3%). The latex particles preferably have an average diameter in the range of about 0.15 to 2 micron. In the case of a non-ionic stabilized latex, the addition of a cation surfactant is necessary in the amount of about 0.2 to 3.5% by weight of the solution. Added to the aqueous solution is 10 to 25% of a water solution of an acid selected from the group hereinafter given as well as a 30% solution of hydrogen peroxide. The aqueous bath solution should contain about $10 \times 10^{-3}$ to $300 \times 10^{-3}$ mol per liter of hydrogen peroxide and about $10 \times 10^{-3}$ to $300 \times 10^{-3}$ mol per liter of an organic acid, the ratio of the acid to hydrogen peroxide being in the range of about 0.25 to 10. The bath is maintained substantially free of dissolved inorganic electrolyte. A metal substrate selected from the group hereinafter given is then dipped into the aforesaid aqueous solution for a period of about 1 minute and less than 1.5 minutes, depending upon the thickness of the film desired.

The following is an example of a process according to the invention: A concentrated solution of cationically stabilized latexes was weighed in a plastic container such that the total solid content of the resulting aqueous solution was 4.2% ±0.1% by weight. $118.37 \times 10^{-3}$ mol per liter of oxalic acid was then added to the solution and the solution stirred for 3 minutes at a pH of 1–3. Thereafter, $118.37 \times 10^{-3}$ mol per liter of hydrogen peroxide was added to the solution and stirred for 5 minutes, the addition of the acid and the peroxide being in a water solution of 10 to 30%. The solution was then ready for a coating operation.

In the example given, a 4"×6" carbon steel panel was dipped into the aqueous solution for 60 seconds and then removed. The result was the deposition of a white coating film of latex with very good adhesion. 93% of the weight of this film was water. Thereafter, the panel was washed with water for a few seconds and then dried in an oven at 60° to 80° C. for 30 minutes. The resulting coating was green colored with a uniform thickness of 1 mil and exhibited very good adhesion. This thickness, however, can be increased by maintaining the panel in the bath for a longer period of time, up to 90 seconds, by increasing the total solid content of the latex in the bath from 4.2% to 10%, for example, or by adjusting the molar ratio of the acid to the peroxide in the bath.

Figure 1:
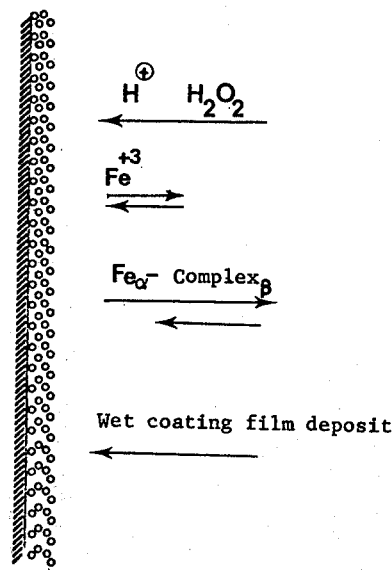

The expected reactions at the surface of the metal plate can be understood from the equations given below as well as by reference to FIG. 1 wherein the numeral 10 designates the steel plate being coated and the numeral 12 designates the latex coating:

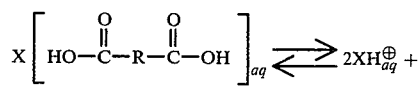

-continued

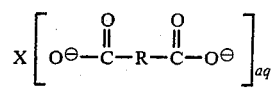

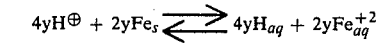

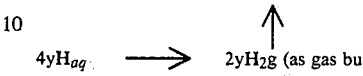

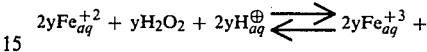

Note: (2y > α)

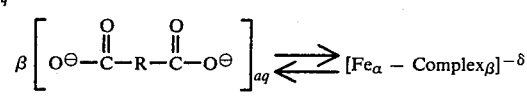

the ratio $\frac{\alpha}{\beta} = \left\{ \frac{1}{3}, \frac{2}{5}, n\left(\frac{1}{2}\right) \right\}$ where $\{1,2,3,4...\}$

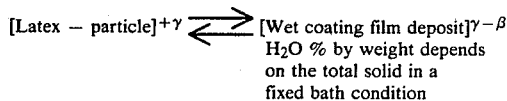

15–25 min @ 60–90° C.

Dry film of latex coating with a thickness depends on
(1) total solid in the bath
(2) time of dipping
(3) kind of metal and latex
(4) the ratio (Acid)/H$_2$O$_2$

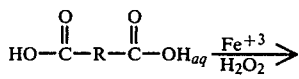

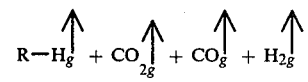

As can be seen from the foregoing equations, metal is dissolved by the acid at the surface, producing Fe$^{+2}$ at a low pH of about 1 to 3. Gaseous hydrogen is formed in the reaction which bubbles to the surface; while Fe$^{+2}$ is converted to Fe$^{+3}$ ions and water in a free radical reaction due to the presence of H$_2$O$_2$. As a side reaction, the presence of Fe$^{+2}$ and Fe$^{+3}$ ions at the surface of the metal is believed to decarboxylate the organic acid to give CO, CO$_2$, H$_2$ and CH$_4$, for example. Fe$^{+3}$ with the negative ligand of the acid forms negative complexes which are absorbed on the surface of the cationic latex, causing the latex particles to fluctuate at the surface of the steel panel. Possibly, some of the acid ligand adsorbs on the surface of the latex particles, neutralizing some of its charge.

As shown by the following Tables I and II, not all organic acids can be used in carrying out the invention; and not all metals can be coated with this particular embodiment of the invention.

TABLE I

| NAME OF ACID | CHEMICAL STRUCTURE OF THE ACID | $K_{a1}$ @ 25° C. | $K_{a2}$ @ 25° C. | $K_{a3}$ @ 25° C. | FORMATION OF NEGATIVE COMPLEXES WITH $Fe^{+3}$ |
|---|---|---|---|---|---|
| FORMIC | H—C(=O)—OH | $1.74 \times 10^{-4}$ | — | — | Not Reported |
| ACETIC | $CH_3$—C(=O)—OH | $1.75 \times 10^{-5}$ | — | — | Not Reported |
| MONOCHLORACETIC | $ClCH_2$—C(=O)—OH | $1.51 \times 10^{-3}$ | — | — | Not Reported |
| LACTIC | $CH_3$—CH(OH)—C(=O)—OH | $1.38 \times 10^{-4}$ | — | — | Not Reported |
| OXALIC | HO—C(=O)—C(=O)—OH | $6.2 \times 10^{-2}$ | $6.1 \times 10^{-5}$ | — | Yes |
| MALONIC | HO—C(=O)—$CH_2$—C(=O)—OH | $1.58 \times 10^{-3}$ | $8.0 \times 10^{-7}$ | — | Yes |
| MALIC | HO—C(=O)—$CH_2$—CH(OH)—C(=O)—OH | $4.0 \times 10^{-4}$ | $8.9 \times 10^{-6}$ | — | Yes |
| TARTARIC | HO—C(=O)—CH(OH)—CH(OH)—C(=O)—OH | $9.4 \times 10^{-4}$ | $2.9 \times 10^{-5}$ | — | Yes |
| CITRIC | HO—C(=O)—$CH_2$—C(OH)(C(=O)OH)—$CH_2$—C(=O)—OH | $7.4 \times 10^{-4}$ | $1.74 \times 10^{-5}$ | $4.0 \times 10^{-7}$ | Yes |
| MANDELIC | $C_6H_5$—CH(OH)—C(=O)—OH | $4.3 \times 10^{-4}$ | — | — | Yes |

TABLE II

| NAME OF ACID | EFFECT ON COPPER PANELS | EFFECT ON ALUMINUM PANELS | EFFECT ON ZINC PANELS | EFFECT ON GALVANIZED STEEL PANELS | EFFECT ON STAINLESS STEEL PANELS | EFFECT ON STEEL PANELS | pH CHANGE DURING PROCESS |
|---|---|---|---|---|---|---|---|
| FORMIC | (−) (0) | (−) | (−) (0) | (−) | (−) | (−) (0) | 0.00 |
| ACETIC | (−) (0) Partially | (−) | (−) | (−) | (−) | (−) (0) | +.03 |
| MONOCHLORACETIC | (−) (0) | (−) | (−) | (−) | (−) | (−) (0) | +.03 |
| LACTIC | (−) (0) | (−) | (−) (0) | (−) | (−) | (−) (0) | 0.00 |
| OXALIC | (−) (0) | (+) ** Longer than 5 min. | (+) | (+) Thin layer | (−) | (+) | 0.00 |
| MALONIC | (−) (0) | (−) | (+) Thin layer | (−) | (−) | (+) | 0.00 |
| MALIC | (−) (0) | (−) | (+) Thin layer | (−) | (−) | (+) | 0.00 |
| TARTARIC | (−) (0) | (−) | (+) Thin layer | (−) | (−) | (+) | 0.00 |
| CITRIC | (−) (0) | (−) | (+) Thin layer | (−) | (−) | (+) | 0.00 |
| MANDELIC | (−) (0) | (−) | (+) Thin layer | (−) | (−) | (+) | 0.00 |

(+) Coating of the panels has taken place
(−) No coating has taken place
(0) Metal has been dissolved but no coating has taken place
** When the aluminum panel remains in contact with a copper panel for a period longer than 5 min., the coating takes place Table II showns that the organic acids which can be used include oxalic acid, malonic acid, malic acid, tartaric acid, citric acid and mandelic acid. All of these acids will produce films on plain carbon steels but will not produce films on stainless steels. Likewise, they will produce latex films on zinc. Only oxalic acid can be utilized to produce films on aluminum and zinc. None of the acids are effective in producing coatings on copper at these conditions. Formic acetic, monochloracetic and lactic acids are all ineffective in producing the coatings on any metals tested.

FIG. 2 illustrates the effect of hydrogen peroxide additions. When no hydrogen peroxide is added (curve E), no coating occurs. At a constant acid concentration of about $79 \times 10^{-3}$ mol per liter, the greatest amount or thickness of coating is achieved for a given time when the peroxide concentration is about $238 \times 10^{-3}$ mol per liter. Above this level, and at about $317 \times 10^{-3}$ mol per liter, for example, the mass of dry coating deposited drops drastically as illustrated by curve A in FIG. 2.

FIG. 3 shows the effect of peroxide addition on the mass of metal dissolved at the surface. As would be expected, increasing amounts of peroxide cause increasing amounts of metal to be dissolved at the surface.

Figure 5:
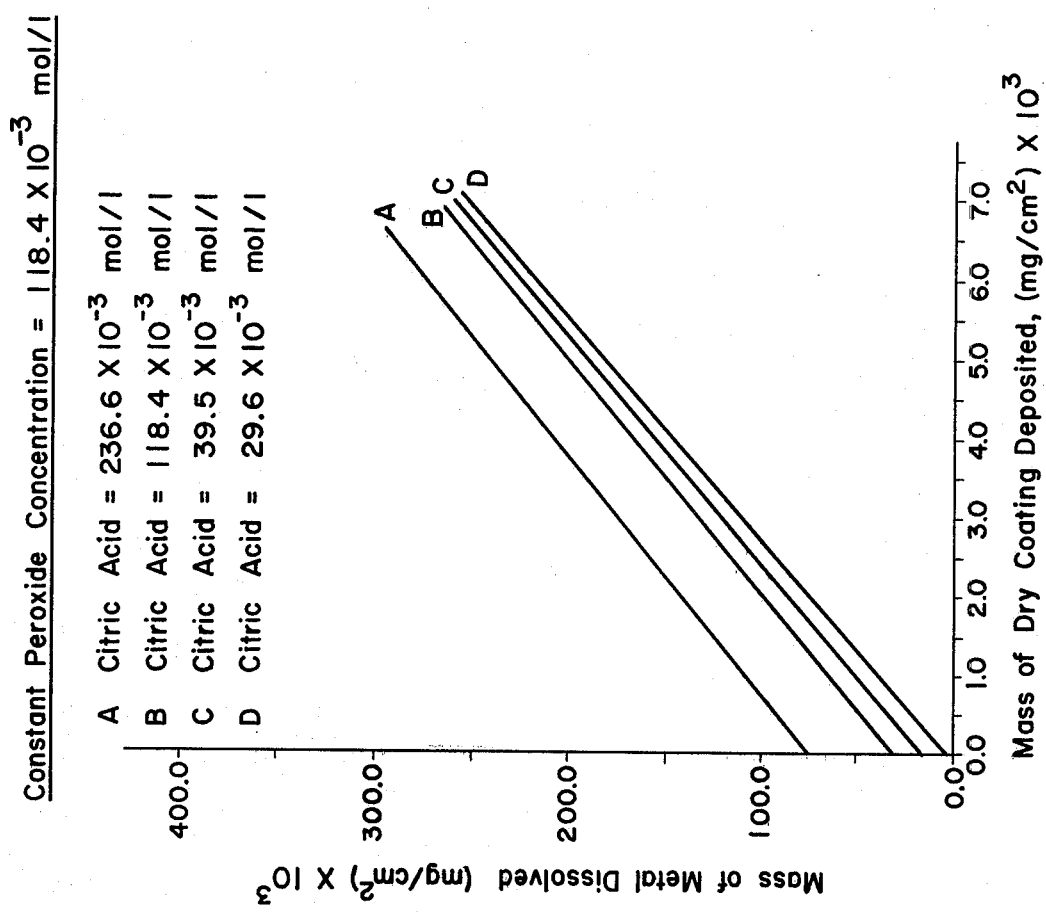
FIG. 5 is a plot of mass of dry coating deposited versus mass of metal dissolved for various citric acid concentrations.
Figure 4:
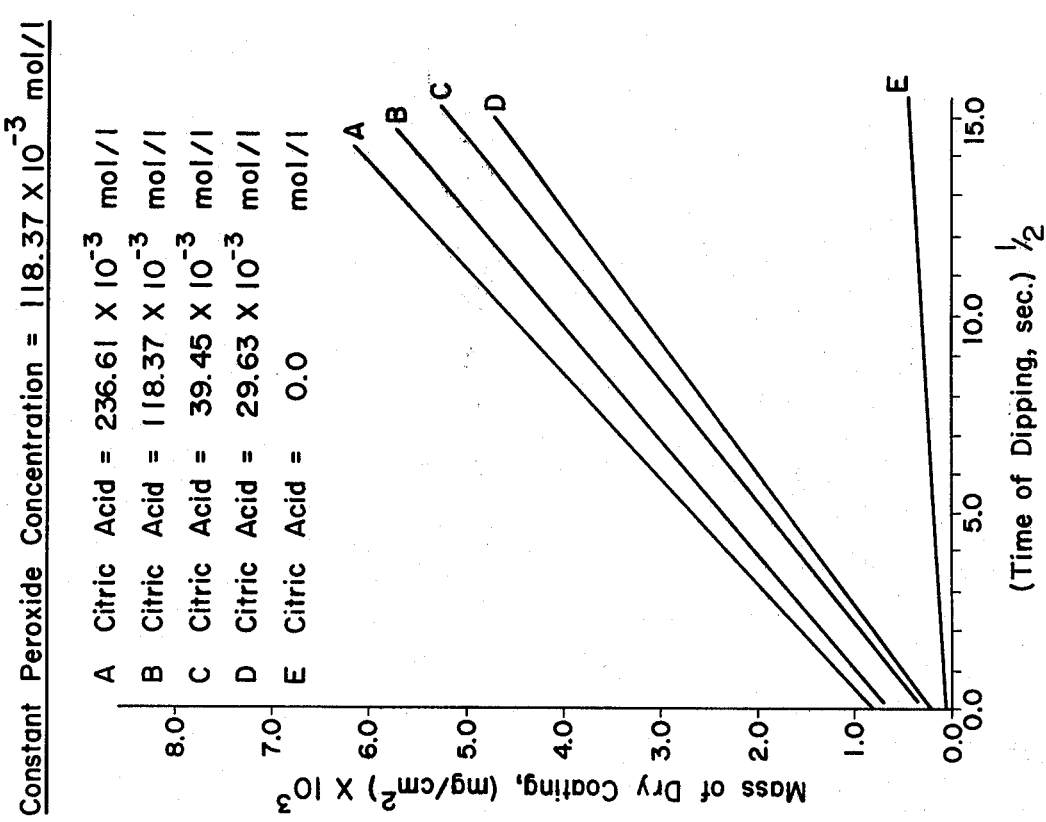
FIG. 4 is a plot of the square root of dipping time versus mass of dry coating for various citric acid concentrations.

FIGS. 4 and 5 illustrate the effect of acid concentration on the mass of dry coating achieved for a given time and the mass of metal dissolved at the surface during the same time. As can be seen, increasing the acid concentration correspondingly increases the mass of dry coating as well as the mass of metal dissolved.

Figure 7:
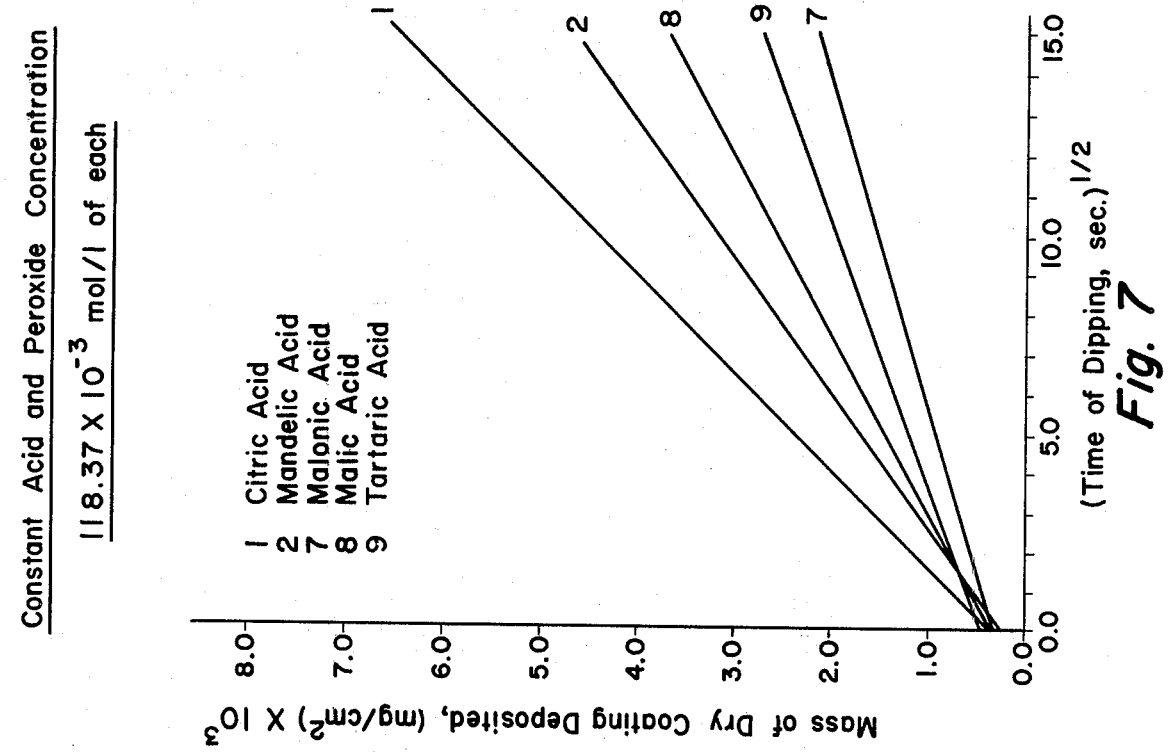
FIG. 7 is a plot of the square root of time of dipping versus mass of dry coating deposited for various acids which can be used in the invention.
Figure 6:
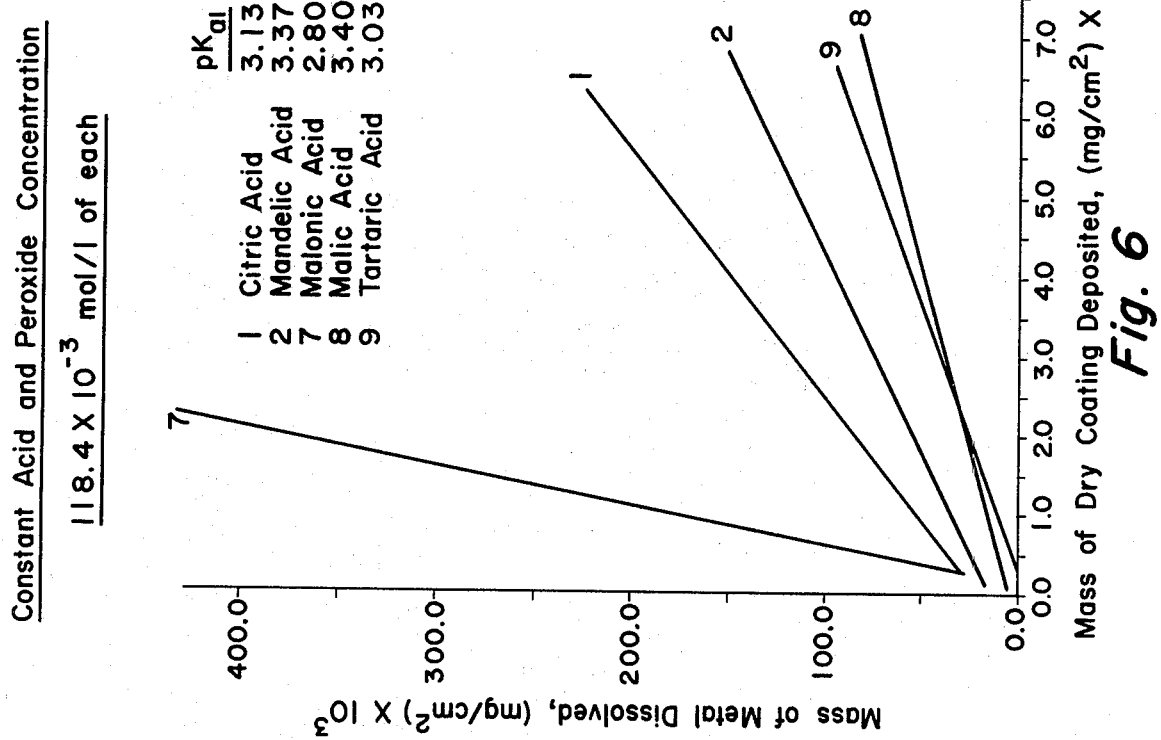
FIG. 6 is a plot of mass of dry coating deposited versus mass of metal dissolved for various different acids which can be utilized in accordance with the invention.
Figure 9:
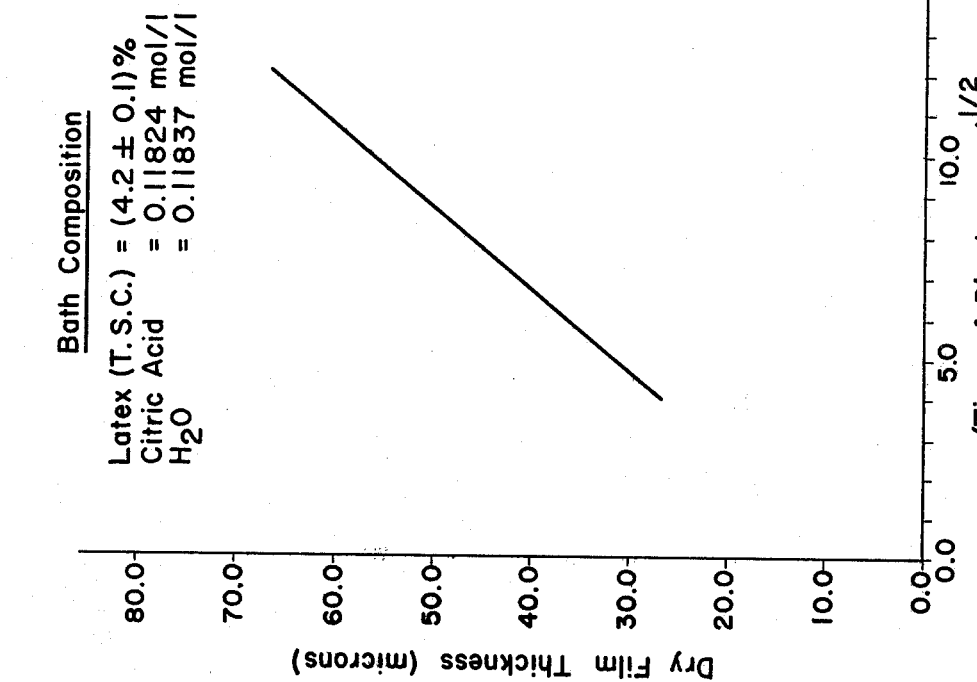
FIG. 9 is a plot of the square root of time of dipping versus dry coating thickness.
Figure 8:
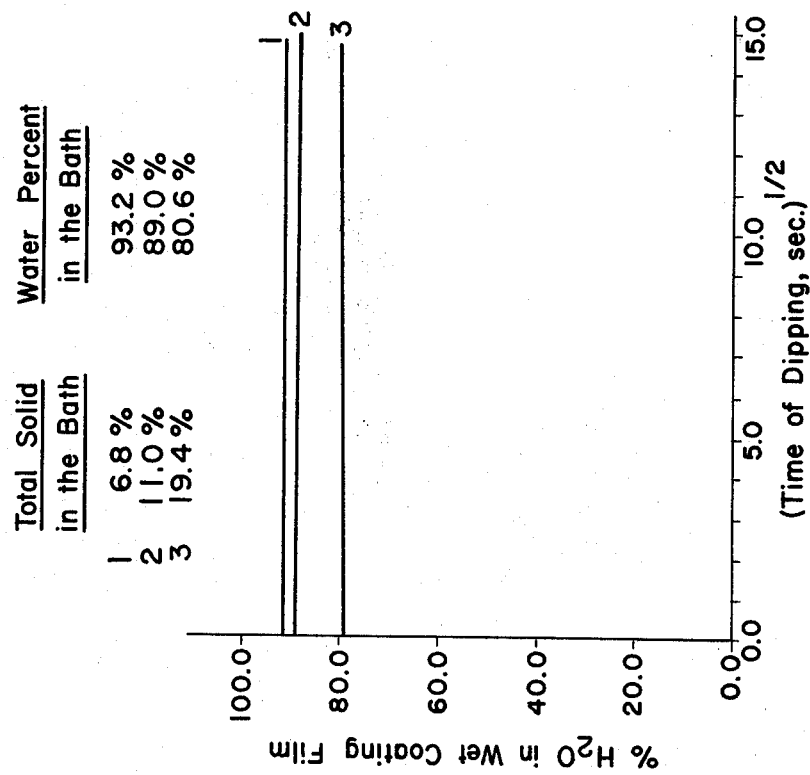
FIG. 8 is a plot of the square root of time of dipping versus percent water in the wet coating film for various solid latex concentrations in the bath.

FIG. 6 is a plot of mass of dry coating deposited versus the mass of metal dissolved for various types of acids. It will be noted that citric acid dissolves a much greater amount of metal for a given mass of coating (curve 1) than malic acid, for example (curve 8). On the other hand, and as shown in FIG. 7, less dipping time for a given mass of coating deposited is required for citric acid than for malonic acid. FIG. 8 shows that the water content in the wet coating film produced in accordance with the process of the invention decreases as the water percent in the bath correspondingly increases; while FIG. 9 shows that, as expected, the dry film thickness increases as a function of dipping time.

Figure 11:
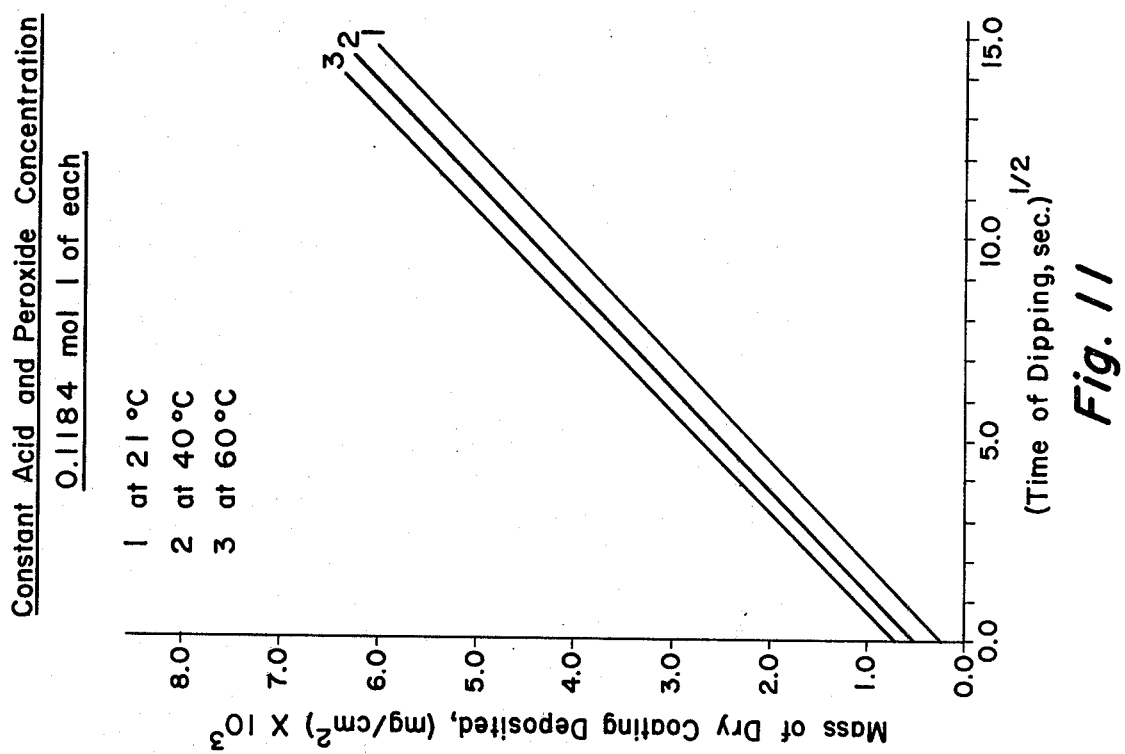
FIG. 11 is a plot of the square root of time of dipping versus mass of dry coating deposited at various temperatures.
Figure 10:
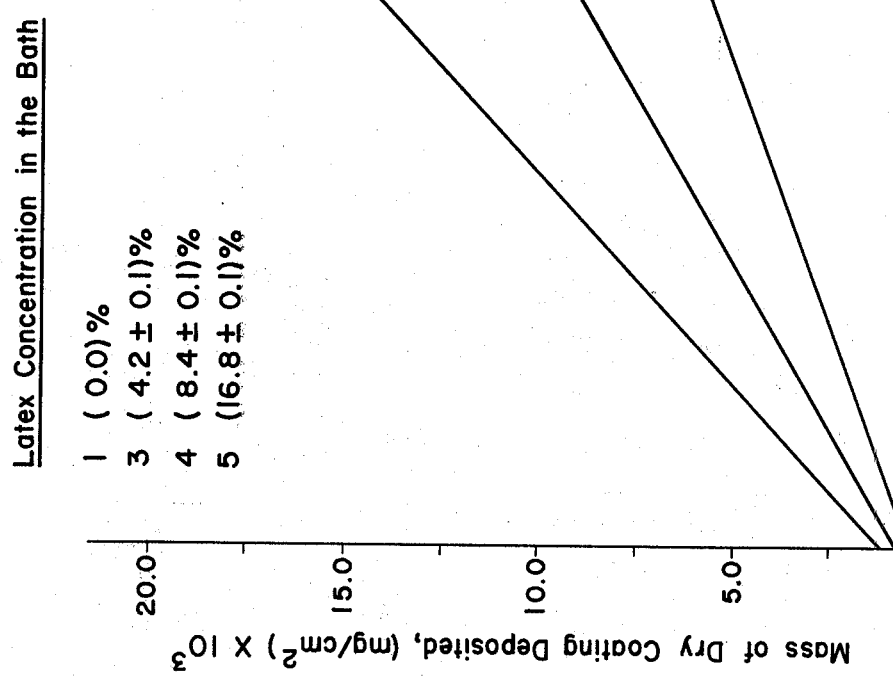
FIG. 10 is a plot of the square root of time of dipping versus mass of dry coating deposited for various latex concentrations in the bath.

FIG. 10 is a plot of time of dipping versus a mass of dry coating deposited for various latex concentrations in the bath. Again, as expected, as the latex concentration increases so also does the mass of dry coating deposited for a given dipping time. Finally, FIG. 11 shows the effect of temperature on the process. As temperature increases, so does the coating mass for a given dipping time; although it is not a particularly critical factor.

The color of the resulting dry film after drying as described above, is dependent upon the kind of acid and the metal substrate used as shown in the following Table III:

TABLE III

| Acid | Substrate | Film Color |
|---|---|---|
| Oxalic | Steel | Green |
| Oxalic | Aluminum | Colorless |
| Oxalic | Zinc | White |
| Mandelic | Steel | Black |
| Citric | Steel | Gold |
| Tartaric | Steel | Colorless |
| Malic | Steel | Gold |

The properties and color of the foregoing films can be changed, however, by simply adding mixtures of two or more of the described acids to the bath, rather than one. It is believed that the resultant variations in color are due to different complexes present in the dry coating film due to the different acids.

Atomic adsorption determination of iron dissolved in carrying out the invention shows that 87% of the iron is in droplets which drop from the panel or other article when it is removed from the bath for drying; 9.5% of the iron is in the dry coating film itself; and only 3.5% of the iron remains in the coating solution.

The molar ratio of the acid to the peroxide is very important in that it affects the adhesion of the wet coating film on the metal surface and the development of undesirable small gas bubbles at the surface of the metal during the coating process. Additionally, the ratio affects the thickness of the coating film. A dipping time longer than 15 minutes will cause a heavy coating which, in turn, reduces the adhesion of the coating to the surface. Proper operating conditions necessary to achieve a very well adhered film, with almost no bubbles in it, involve a dipping time of less than 90 seconds and an acid-peroxide ratio in the range of 0.25 to 10. The criticality of the ratio is illustrated in FIG. 2 where the coating deposited decreases (curve A) at an acid-peroxide ratio of about 0.25 but produces optimum results (curve B) at a ratio of about 0.33. Below a ratio of about 0.25, too much metal is dissolved and above a ratio of 10, little latex is deposited.

Increasing the total mol acid and peroxide added to the whole bath will affect the appearance of the dry film by darkening the color and will increase the metal dissolved which plays a large role in shortening the lifetime of the bath solution. Additionally, increasing total mol acid and peroxide added will increase the thickness of the dry coating. For best results, the peroxide added should not exceed about $300 \times 10^{-3}$ mol per liter using the aforesaid acid-peroxide ratio of 0.25 to 10. By adding about $140 \times 10^{-3}$ mol per liter of potassium dichromate in solution form (i.e., 0.02%), the adhesion of the film is improved.

As was mentioned above, any latex which carries a net positive electrical charge can be utilized in the process of the invention. For example, a non-ionic latex comprising 60% butylacrylate and 40% styrene can be utilized with the addition of about 1 to 3% of a cationic surfactant such as arquard (16) which has the following formula:

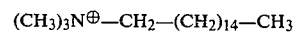

$$(CH_3)_3N^{\oplus}—CH_2—(CH_2)_{14}—CH_3$$

Alternatively, a non-ionic latex comprising 40% butylacrylate and 60% styrene can be employed with the addition of about 1 to 3% of a cationic surfactant such as arquard (18) which has the following formula:

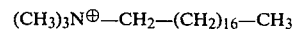

$$(CH_3)_3N^{\oplus}—CH_2—(CH_2)_{16}—CH_3$$

As another example, a latex which can be used comprises 80% ethylacrylate and 20% methylmethacrylate. Commercially available latexes such as E-1037 Rohm and Haas cationically stabilized lates, W. R. Grace 3462-D latex and E-1050 Rohm and Haas cationically stabliized latex have been used successfully in practicing the invention.

A red pigment, for example, can be added to the coating by grinding together red iron oxide and talc and mixing these materials with a cationic surfactant which is added to the aqueous coating bath. Pigmentation is possible with any pigment which is stable at a pH of 1 to 3. Coating can be achieved by dipping, spraying or by brush.

In a specific example of pigmented coatings, 50 grams of $Fe_2O_3$ were mixed with 50 grams of talc and 100 grams of water and ground for 16 hours to produce a red paste. Three grams of this red paste were mixed with 3 grams of a cationic surfactant (arquard) and stirred for 5 minutes. This was added to an aqueous solution containing 5% by weight of latex particles, $110 \times 10^{-3}$ mol per liter of $H_2O_2$ and $118 \times 10^{-3}$ mol per liter of citric acid. Coating was carried out as above to give a good red latex film. White films can be produced utilizing $TiO_2$ rather than $Fe_2O_3$.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. An autodeposition process for coating a metallic surface which comprises preparing an aqueous solution substantially free of dissolved inorganic electrolyte, containing 2 to 30% by weight of cationically stabilized latex particles substantially free of hydrogen peroxide, adding to said aqueous solution about $10 \times 10^{-3}$ to $300 \times 10^{-3}$ mol per liter of hydrogen peroxide and about $10 \times 10^{-3}$ to $300 \times 10^{-3}$ mol per liter of an organic acid which is capable of forming charged metal complexes from metal ions, contacting said metallic surfaces with the said solution until a latex coating of a predetermined thickness has formed thereon.

2. The autodeposition process of claim 1 wherein said organic acid is selected from the group consisting of oxalic acid, malonic acid, malic acid, tartaric acid, citric acid and mandelic acid.

3. The autodeposition process of claim 1 wherein said metallic surface is formed from a metal selected from the group consisting of aluminum, zinc and carbon steel.

4. The autodeposition process of claim 1 wherein a ratio of the organic acid to hydrogen peroxide in said solution is in the range of about 0.25 to 10.

5. The autodeposition process of claim 1 wherein said latex particles comprise non-ionic stabilized latexes, and including the step of adding a cationic surfactant to said aqueous solution.

6. An autodeposition process of claim 1 where said aqueous solution substantially free of dissolved inorganic electrolytes contains about 4.2% by weight of cationically stabilized latex particles having an average diameter in the range of about 0.15 to 2 microns.

* * * * *